(12) United States Patent
Nakano et al.

(10) Patent No.: US 9,188,470 B2
(45) Date of Patent: Nov. 17, 2015

(54) THERMAL FLOW METER

(75) Inventors: Hiroshi Nakano, Naka-gun (JP);
Masahiro Matsumoto, Hitachi (JP);
Satoshi Asano, Hitachi (JP); Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 218 days.

(21) Appl. No.: 13/813,094

(22) PCT Filed: Jul. 28, 2011

(86) PCT No.: PCT/JP2011/067198
§ 371 (c)(1),
(2), (4) Date: Mar. 29, 2013

(87) PCT Pub. No.: WO2012/014956
PCT Pub. Date: Feb. 2, 2012

(65) Prior Publication Data
US 2013/0199280 A1 Aug. 8, 2013

(30) Foreign Application Priority Data
Jul. 30, 2010 (JP) ................................ 2010-171305

(51) Int. Cl.
*G01F 1/68* (2006.01)
*G01F 1/692* (2006.01)
(Continued)

(52) U.S. Cl.
CPC .............. *G01F 1/692* (2013.01); *G01F 1/6842* (2013.01); *G01F 1/699* (2013.01)

(58) Field of Classification Search
CPC ....................................................... G01F 1/68

USPC ........................ 73/204.11, 204.22, 204.26
See application file for complete search history.

(56) References Cited

U.S. PATENT DOCUMENTS 6,314,807 B1    11/2001  Kawai et al.
7,270,000 B2 *   9/2007  Nakada et al. ............. 73/204.26
(Continued)

FOREIGN PATENT DOCUMENTS

JP          10-62220 A      3/1998
JP          11-148849 A     6/1999
(Continued)

OTHER PUBLICATIONS

Corresponding International Search Report with English Translation dated Aug. 23, 2011 (five (5) pages).

*Primary Examiner* — Jewel V Thompson
(74) *Attorney, Agent, or Firm* — Crowell & Moring LLP

(57) ABSTRACT

An object of the present invention is to provide a thermal type flow rate sensor that offers high sensitivity and improved reliability. A sensor element according to the present invention includes a semiconductor substrate, a cavity portion formed on the semiconductor substrate, a heating resistor formed on the cavity portion via an electrically insulating film, a heating temperature sensor for detecting heating temperature of the heating resistor, and a driving circuit for controlling the heating temperature of the heating resistor using the temperature detected by the heating temperature sensor. The heating temperature sensor comprises temperature-sensitive resistors having resistance values varying according to temperature and disposed upstream and downstream of a direction of flow of a fluid to be measured relative to the heating resistor and on upper and lower sides in a direction perpendicular to the direction of flow of the fluid to be measured relative to the heating resistor.

17 Claims, 16 Drawing Sheets

(51) Int. Cl.
*G01F 1/684* (2006.01)
*G01F 1/699* (2006.01)

(56) References Cited

U.S. PATENT DOCUMENTS

| | | |
|---|---|---|
| 2002/0073774 A1 | 6/2002 | Kohno |
| 2006/0220662 A1* | 10/2006 | Nakano et al. ............... 324/693 |
| 2007/0089503 A1* | 4/2007 | Nakano et al. ............. 73/204.26 |
| 2007/0181554 A1 | 8/2007 | Nakano et al. |
| 2008/0168650 A1 | 7/2008 | Sakuma |
| 2008/0229818 A1 | 9/2008 | Nakano et al. |
| 2010/0132452 A1 | 6/2010 | Sakuma |
| 2010/0170335 A1 | 7/2010 | Nakano et al. |
| 2010/0242591 A1 | 9/2010 | Nakano et al. |

FOREIGN PATENT DOCUMENTS

| | | |
|---|---|---|
| JP | 2001-27558 A | 1/2001 |
| JP | 2002-188497 A | 7/2002 |
| JP | 2007-205986 A | 8/2007 |
| JP | 2008-170382 A | 7/2008 |
| JP | 2008-233012 A | 10/2008 |
| JP | 2010-223747 A | 10/2010 |

* cited by examiner

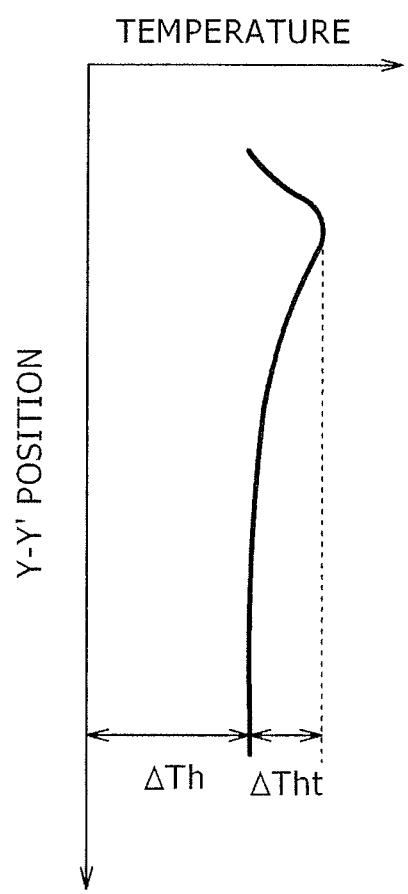

THERMAL FLOW METER

TECHNICAL FIELD

The present invention relates to thermal flow meters having a heating resistor disposed in a fluid to be measured and measuring a flow rate of the fluid. In particular, the present invention relates to a thermal flow meter suitable for measuring a flow rate of intake air or exhaust gas associated with an automotive internal combustion engine.

BACKGROUND ART

A thermal type air flow meter capable of directly measuring a mass flow rate has been the mainstream of an air flow meter for detecting an amount of intake air in an internal combustion engine for use in, for example, an automobile.

In recent years, a technique has been proposed for manufacturing a sensor element of a thermal flow meter on a semiconductor substrate, such as silicon (Si), using micromachining technology. In such a sensor element of semiconductor type, a hollow portion is formed by removing part of the semiconductor substrate, the part having a rectangular shape. Then, an electrically insulating film having a thickness of several microns is formed on the hollow portion and a heating resistor is formed on the electrically insulating film. In addition, a temperature difference system that includes temperature sensors (temperature-sensitive resistors) disposed at points upstream and downstream of the heating resistor may be incorporated to determine the direction in which the fluid flows, whether a forward flow or a backward flow, based on the difference in temperature between the these points. The heating resistor is as small as having a size of several hundreds of microns and formed into a thin film. The heating resistor thus has a small heat capacity and is capable of exhibiting fast response and low electric power consumption.

Patent document 1 discloses a technique attempting to achieve low electric power consumption of the sensor element. The technique disclosed in patent document 1 attempts to achieve low electric power consumption while maintaining sensitivity by incorporating a heating resistor having a shorter length.

PRIOR ART LITERATURE

Patent Document

Patent Document 1: JP-2008-233012-A

SUMMARY OF THE INVENTION

Problem to be Solved by the Invention

To mount an air flow meter, such as that described above, in an internal combustion engine of, for example, an automobile, a technique is very often used to dispose a sensor element in a subsidiary passage through which part of an air flow is drawn in, thereby reducing contamination of the sensor element. The subsidiary passage in which the sensor element is disposed is bent into a variety of shapes in order to protect the sensor element from, for example, oil and dust. As a result, the direction in which air flows over the sensor element changes according to the flow rate of the air. A change in the direction of the air flow results in an error occurring in the flow rate detected by the sensor element.

Moreover, a smaller heating resistor poses another problem in that uniformity of temperature distribution in areas around the heating resistor is aggravated, which causes a detecting sensitivity of the sensor element to vary with an even small change in the direction of the air flow, resulting in a large measurement error. Temperature distribution occurring from heat generated by the heating resistor has been considered; however, no consideration has been given to uniformity of temperature distribution by self-heating of a temperature-sensitive resistor incorporated for detecting temperature of the heating resistor and controlling to heat the heating resistor.

It is an object of the present invention to provide a thermal type flow rate sensor that is to be mounted on an internal combustion engine of, for example, an automobile and that reduces a change in detecting sensitivity of a sensor element caused by a minimal change in a direction of airflow and a flow rate measuring error, offers high accuracy, and consumes low electric power.

Means for Solving the Problem

To achieve the foregoing object, an aspect of the present invention provides a thermal flow meter including: a subsidiary passage having an opening portion through which a fluid to be measured is to be drawn in; and a sensor element disposed in the subsidiary passage, the sensor element for measuring a flow rate of the fluid to be measured, wherein the sensor element includes: a semiconductor substrate; a cavity portion formed in the semiconductor substrate; a heating resistor formed on the cavity portion via an electrically insulating film; a heating temperature sensor for detecting heating temperature of the heating resistor; and a driving circuit for controlling the heating temperature of the heating resistor using the temperature detected by the heating temperature sensor; and the heating temperature sensor includes temperature-sensitive resistors having resistance values varying according to temperature and disposed upstream and downstream of a direction of flow of the fluid to be measured relative to the heating resistor and on upper and lower sides in a direction perpendicular to the direction of flow of the fluid to be measured relative to the heating resistor. Preferably, the heating temperature sensors are electrically connected in series on the cavity portion.

This causes a temperature increase by self-heating by current flowing through the heating temperature sensor to be uniform temperature distribution in an area around the heating resistor.

Effect of the Invention

The aspect of the present invention can provide a thermal type flow rate sensor that reduces a change in detecting sensitivity of a sensor element caused by a minimal change in the direction of airflow and a flow rate measuring error, offers high accuracy, and consumes low electric power. The disclosure of Japanese Patent Application No. 2010-171305 including the specification and/or drawings is incorporated herein by reference in its entirety.

BRIEF DESCRIPTION OF THE DRAWINGS

FIG. 8 is a diagram showing temperature distribution on line Y-Y' of FIG. 6(a).

MODES FOR CARRYING OUT THE INVENTION

Embodiments of the present invention will be described below.

First Embodiment

A first embodiment of the present invention will be described below.

Figure 1:
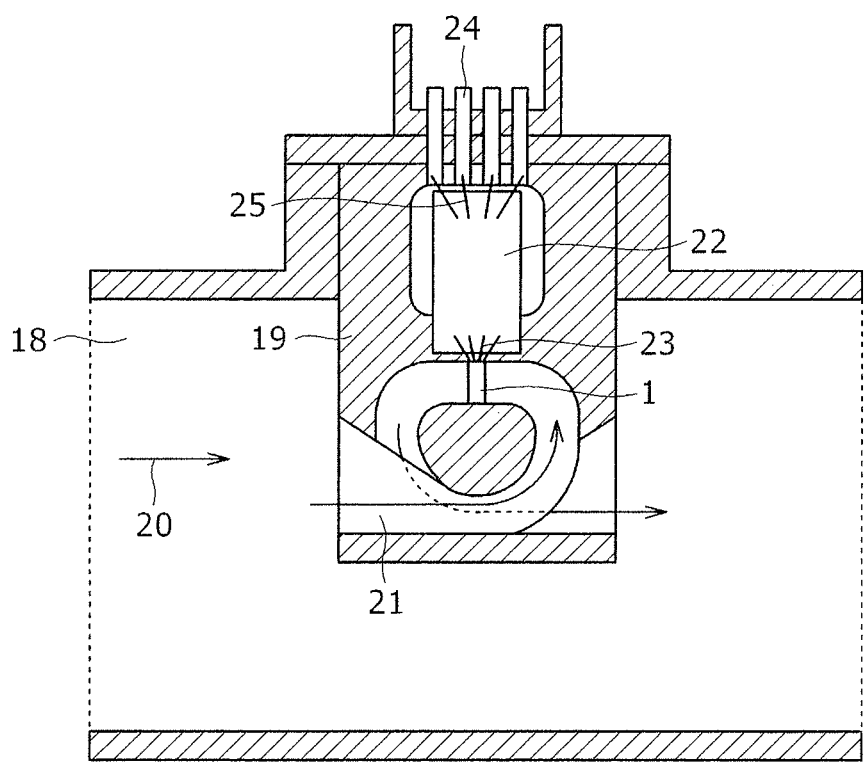
FIG. 1 is an illustration showing a mounting structure of a sensor element 1 in a thermal type flow rate sensor.

FIG. 1 shows an embodiment in which a sensor element 1 and a driving and detecting circuit of the sensor element 1 mounted in an intake pipe of an internal combustion engine in, for example, an automobile. Referring to FIG. 1, a base member 19 is disposed so as to protrude from a wall surface of an intake line 18. The base member 19 includes a subsidiary passage 21 formed therein such that part of intake air 20 that flows through the intake line 18 is allowed to be drawn into the subsidiary passage 21. The subsidiary passage 21 has an opening portion through which the intake air 20 is to be introduced or discharged. A throttle having a gradually narrowing passage area is formed at a position near the opening portion of the subsidiary passage 21. The subsidiary passage 21 also includes a curved portion in its pathway. The curved portion causes the intake air 20 introduced to the subsidiary passage 21 to turn around, so that a pathway structure is formed to include a portion at which airflow is opposite to a flow direction of the intake air 20. The sensor element 1 is disposed in a rectangular recess formed at this portion. Forming the curved portion in the subsidiary passage 21 allows air to flow along the curved portion and particles, such as dust, entering the subsidiary passage 21 to be separated by inertia, thus preventing the particles from colliding directly with the sensor element 1 and the sensor element 1 from being destroyed. The pathway of the portion of the subsidiary passage 21 at which the sensor element 1 is disposed is linear. This achieves an effect of maintaining a steady flow direction of air flowing to the sensor element 1. However, the linear pathway at which the sensor element 1 is disposed has a limited length and an increased flow velocity poses a problem of changing flow directions. It is therefore difficult to prevent dust collision and maintain a steady flow direction of the airflow.

The base member 19 includes a circuit board 22 on which the driving and detecting circuit of the sensor element 1 is mounted. The sensor element 1 and the circuit board 22 are electrically connected by a gold bonding wire 23. The base member 19 further includes a terminal 24 for supplying electric power to the driving circuit or extracting an output signal. The circuit board 22 and the terminal 24 are electrically connected by an aluminum bonding wire 25.

Figure 2:
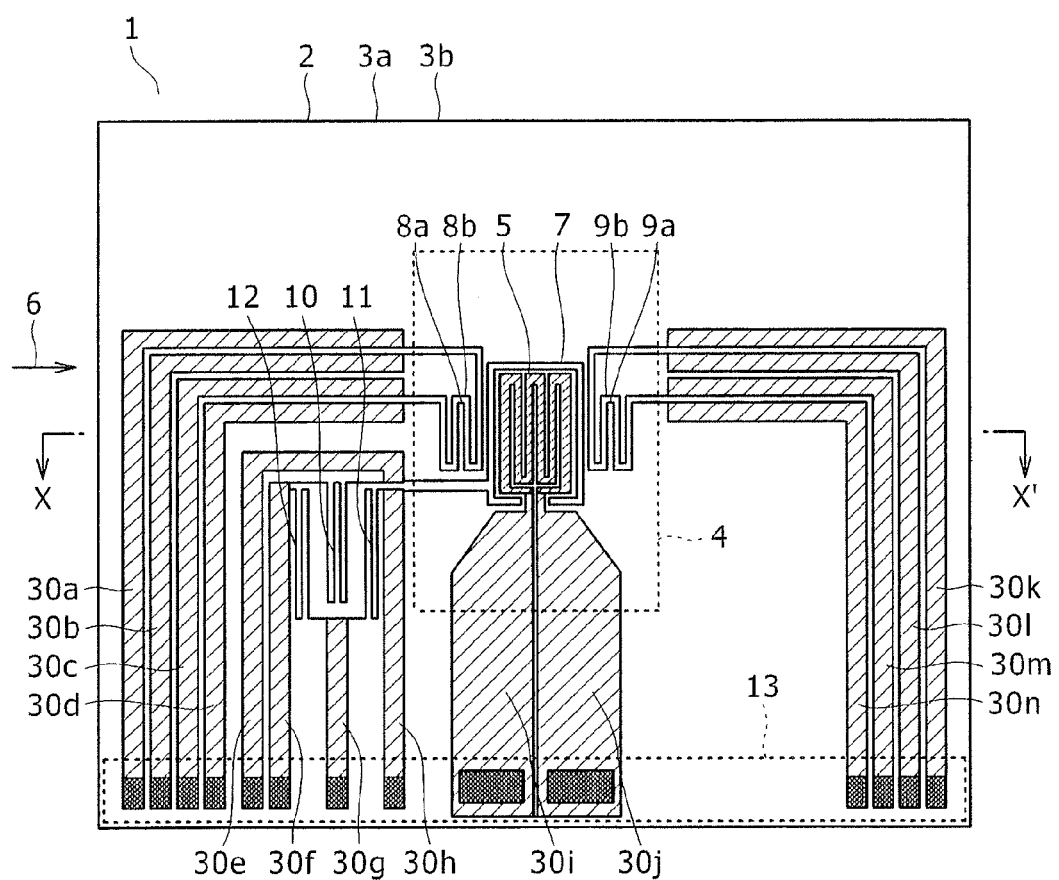
FIG. 2 is a plan view showing the sensor element 1 of the thermal type flow rate sensor according to a first embodiment of the present invention.
Figure 3:
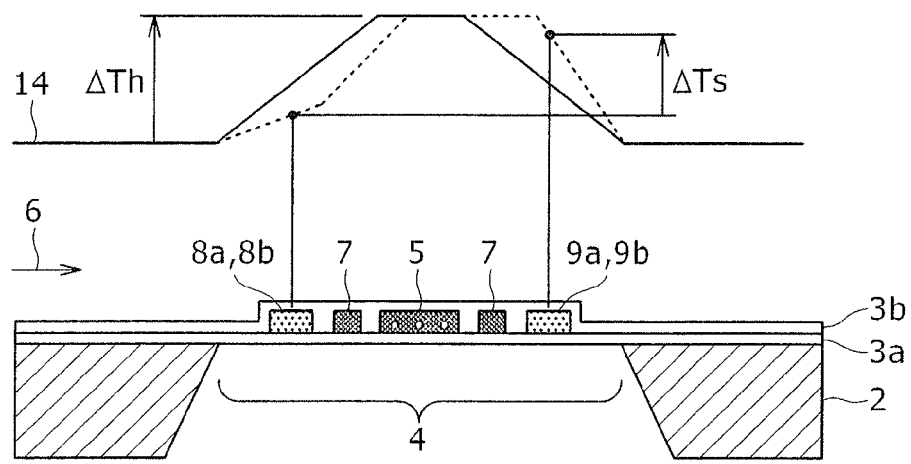
FIG. 3 is a cross-sectional view taken along line X-X' of the sensor element 1 shown in FIG. 2.

An arrangement of the sensor element 1 of a thermal flow meter according to the embodiment will be described below with reference to FIGS. 2 and 3. FIG. 2 is a plan view showing the sensor element 1. FIG. 3 is a cross-sectional view taken along line X-X' in FIG. 2. The sensor element 1 includes a substrate 2 formed of a material having a good thermal conductivity, such as silicon and ceramics. An electrically insulating film 3a is formed on the substrate 2. The substrate 2 is then etched from a back side thereof to form a cavity portion, thus forming a diaphragm 4.

A heating resistor 5 is formed on a surface near a center of the electrically insulating film 3a on the diaphragm 4. A heating temperature sensor 7 for detecting heating temperature of the heating resistor 5 is formed around the heating resistor 5 so as to surround the heating resistor 5. The heating temperature sensor 7 detects a temperature of the heating resistor 5 and heating control is performed to ensure that the temperature is higher by a predetermined temperature relative to the temperature of airflow 6. In addition, upstream-side temperature sensors 8a, 8b and downstream-side temperature sensors 9a, 9b are formed on the outside of the heating temperature sensor 7. The upstream-side temperature sensors 8a, 8b are disposed upstream in the airflow 6 of the heating resistor 5. The downstream-side temperature sensors 9a, 9b are disposed downstream in the airflow 6 of the heating resistor 5. An electrically insulating film 3b covers a frontmost surface of the sensor element 1. The electrically insulating film 3b serves as a protective film, in addition to providing electrical insulation. Temperature-sensitive resistors 10, 11, 12 having resistance values varying according to the temperature of the airflow 6 are disposed on the electrically insulating film 3a on the outside of the diaphragm 4.

The heating resistor 5, the heating temperature sensor 7, the upstream-side temperature sensors 8a, 8b, the downstream-side temperature sensors 9a, 9b, and the temperature-sensitive resistors 10, 11, 12 are formed of a material having a resistance value varying according to temperature, specifically, a relatively high temperature coefficient of resistance. Preferred materials include, for example, semiconductor materials such as polycrystalline silicon and monocrystalline silicon that are doped with impurities and metal materials such as platinum, molybdenum, tungsten, and nickel alloys. The electrically insulating film 3a, 3b are to be formed into a thin film having a thickness of about 2 microns, using silicon dioxide ($SiO_2$) or silicon nitride ($Si_3N_4$) to thereby offer a structure of achieving a sufficient heat insulation effect.

It is noted that, as described above, the heating resistor 5, the heating temperature sensor 7, the upstream-side temperature sensors 8a, 8b, and the downstream-side temperature sensors 9a, 9b are a temperature-sensitive resistor like the temperature-sensitive resistors 10, 11, 12.

Additionally, an electrode pad portion 13 is formed on an end portion of the sensor element 1. The electrode pad portion 13 includes electrodes formed thereon for connecting each of resistors constituting the heating resistor 5, the heating temperature sensor 7, the upstream-side temperature sensors 8a, 8b, the downstream-side temperature sensors 9a, 9b, and the temperature-sensitive resistors 10, 11, 12 to the driving and detecting circuit. The electrodes are formed of, for example, aluminum.

The thermal flow meter according to the embodiment of the present invention operates as follows.

FIG. 3 shows an arrangement of parts on the cross section taken along line X-X' of FIG. 2 and temperature distribution on line X-X'. A solid line of temperature distribution 14 shows distribution of temperatures of the diaphragm 4 in a windless state. The heating resistor 5 is heated to a temperature that is ΔTh higher than a temperature of the airflow 6. A broken line of the temperature distribution 14 is distribution of temperatures of the diaphragm 4 when the airflow 6 occurs. The occurrence of the airflow 6 results in the following: specifically, an upstream side of the heating resistor 5 is cooled by the airflow 6 to have a reduced temperature, while air that has flowed past, and is thus heated by, the heating resistor 5 flows in a downstream side of the heating resistor 5 to develop an increased temperature. A flow rate is therefore determined by measuring a temperature difference ΔTs across the heating resistor 5 using the upstream-side temperature sensors 8a, 8b and the downstream-side temperature sensors 9a, 9b.

Figure 4:
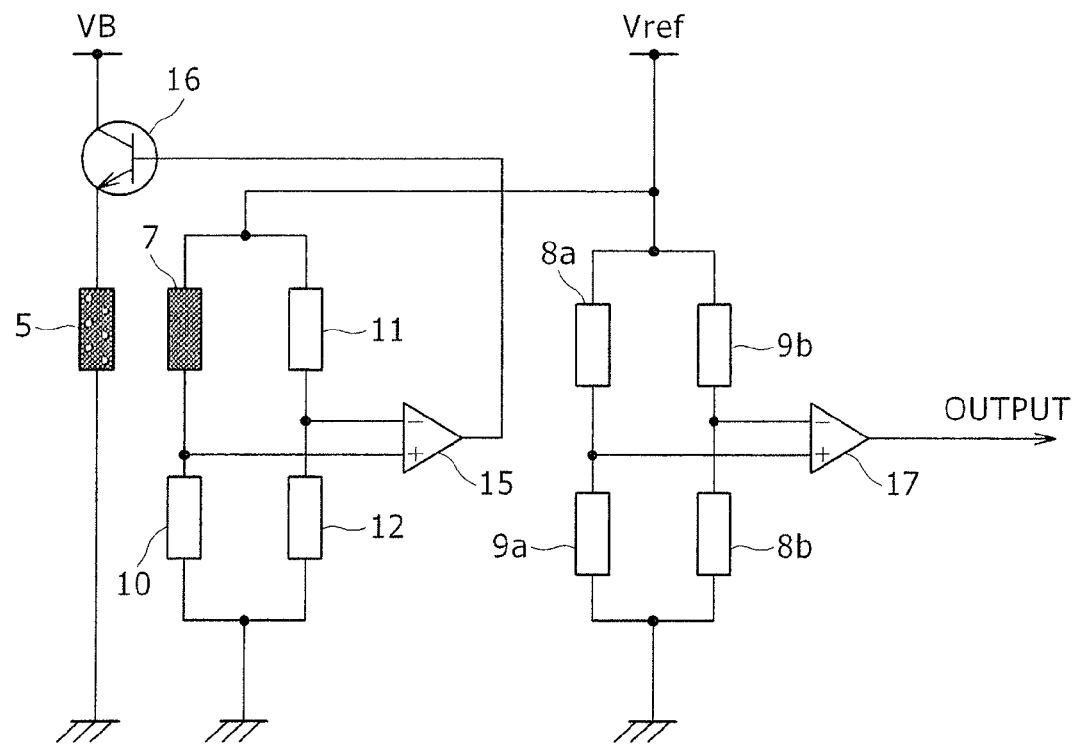
FIG. 4 is a diagram showing an electric circuit for driving the sensor element 1 shown in FIG. 1.

The driving and detecting circuit of the sensor element 1 will be described below. FIG. 4 shows the driving and detecting circuit of the sensor element 1. A bridge circuit is formed. The bridge circuit connects the heating temperature sensor 7 having a resistance value varying according to the temperature of the heating resistor 5 to two series circuits in parallel with each other. One of the series circuits includes the temperature-sensitive resistor 10. The other series circuit includes the temperature-sensitive resistors 11, 12. A reference voltage Vref is applied to each of these series circuits. An intermediate voltage of each of these series circuits is extracted and connected to an amplifier 15. An output of the amplifier 15 is connected to a base of a transistor 16. A collector of the transistor 16 is connected to a power source VB and an emitter thereof is connected to the heating resistor 5 to thereby constitute a feedback circuit. This allows a temperature Th of the heating resistor 5 to be controlled to be higher by a predetermined temperature ΔTh (=Th−Ta) than a temperature Ta of the airflow 6.

Then, a series circuit including the upstream-side temperature sensor 8a and the downstream-side temperature sensor 9a and a series circuit including the downstream-side temperature sensor 9b and the upstream-side temperature sensor 8b are connected in parallel with each other to form a bridge circuit. The reference voltage Vref is then applied to each of these series circuits. If the airflow causes a temperature difference to occur between the upstream-side temperature sensors 8a, 8b and the downstream-side temperature sensors 9a, 9b, a resistance balance of the bridge circuit changes to create a differential voltage. An amplifier 17 then uses differential voltage to produce an output according to the air flow rate.

Figure 5:
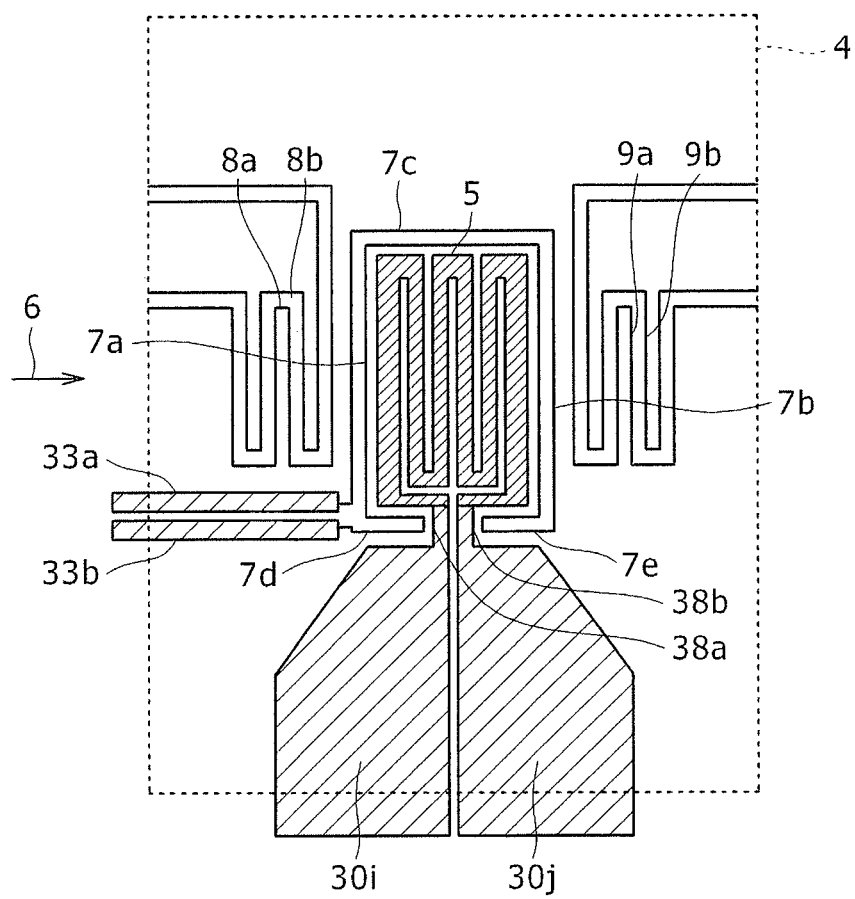
FIG. 5 is an enlarged view showing a diaphragm 4 portion of the sensor element 1 shown in FIG. 1.

FIG. 5 is an enlarged view showing the diaphragm 4 of the sensor element 1. Referring to FIG. 5, heating temperature sensors 7a to 7e are disposed so as to surround the heating resistor 5. The heating temperature sensor 7a is disposed upstream in the airflow 6 (hereinafter referred to as the left side on the paper surface) of the heating resistor 5. The heating temperature sensor 7b is disposed downstream in the airflow 6 (hereinafter referred to as the right side on the paper surface) of the heating resistor 5. The heating temperature sensor 7c is disposed on the upper side in the vertical direction of the airflow, specifically, on a central axis side of the main passage 18 in FIG. 1 of the heating resistor 5 (hereinafter referred to as the upper side on the paper surface). The heating temperature sensors 7d, 7e are disposed on the lower side in the vertical direction of the airflow, specifically, on the side of the circuit board 22 in FIG. 1 of the heating resistor 5 (hereinafter referred to as the lower side on the paper surface). The heating temperature sensors 7a to 7e are electrically connected in series on the diaphragm 4. The heating temperature sensors 7a to 7e connected in series with each other constitute the heating temperature sensor 7. The heating resistor 5 is connected electrically to wiring portions 30i, 30j and heating current is supplied from the outside of the diaphragm 4.

The heating resistor 5 and wiring portions 30i, 30j have connecting portions that include throttle portions. Specifically, recesses 38a, 38b are formed by the heating resistor 5 and the wiring portions 30i, 30j. The recess 38a has a side surface on a first side that forms part of the heating resistor 5 and a side surface on a second side that assumes the wiring portion 30i. The recess 38b has a side surface on a first side that forms part of the heating resistor 5 and a side surface on a second side that assumes the wiring portion 30j. It is noted that the wires 30i, 30j have a wire width narrower than a wire width in a short side direction of the heating resistor 5 at the connecting portions of the heating resistor 5 and the wiring portions 30i, 30j and a wire width wider at an end portion of the diaphragm 4.

The heating temperature sensor 7d is disposed at the recess 38a so as to be fitted therein. The heating temperature sensor 7e is disposed at the recess 38b so as to be fitted therein. Specifically, the heating temperature sensors 7d, 7e are disposed along the shape of the throttle portion. The foregoing arrangement allows the heating temperature sensors 7a to 7e to be disposed to surround the heating resistor 5, so that a self-heating value achieved by current flowing through the heating temperature sensors 7a to 7e is substantially symmetrical in the vertical and horizontal directions of the paper surface. In addition, having a compactly shaped heating resistor 5 with a size of as small as 400 μm or less achieves uniform temperature distribution in the vertical and horizontal directions of the heating resistor 5 even with self-heating by the heating temperature sensors 7a to 7e disposed around the heating resistor 5.

It is noted that the area of the heating resistor 5 assumes a main part of heating on the diaphragm 4 and does not include, for example, the wide portions of the wiring portions 30i, 30j shown in FIG. 5 and a resistor that is electrically connected to the heating resistor 5, but through which only an extremely small current flows. Alternatively, as with the heating resistor 5 shown in FIG. 5, the area assumes a main heating part having one or a plurality of turnarounds so as to be formed into a U-shape or M-shape. While a good effect can be achieved by the heating temperature sensor 7 that surrounds the entire periphery of the heating resistor 5, a sufficient effect can still be achieved by a heating temperature sensor 7 disposed substantially uniformly at the upper portion, the lower portion, the right portion, and the left portion of the heating resistor 5.

Effects when the airflow that flows to the sensor element 1 of the thermal flow meter having the foregoing arrangements inclines will be described below as compared with the related-art arrangement.

Figure 6A:
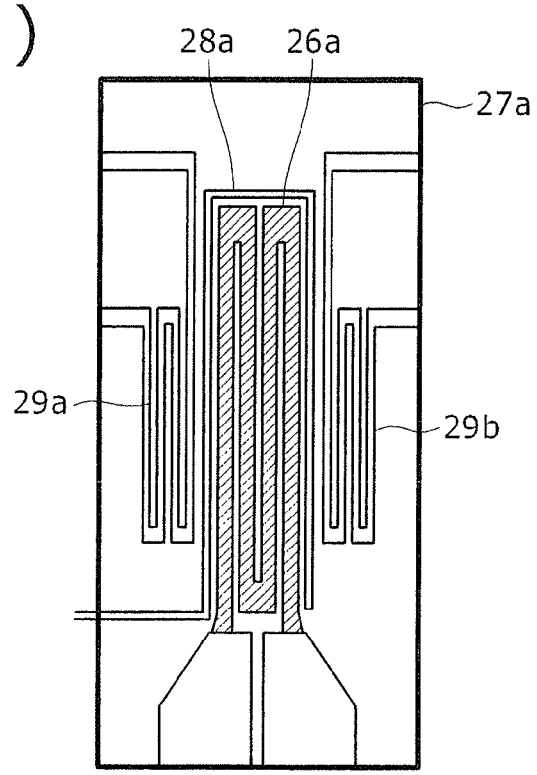
FIG. 6(a) is an illustration showing the shape of a diaphragm portion of a related-art sensor element.
Figure 6B:
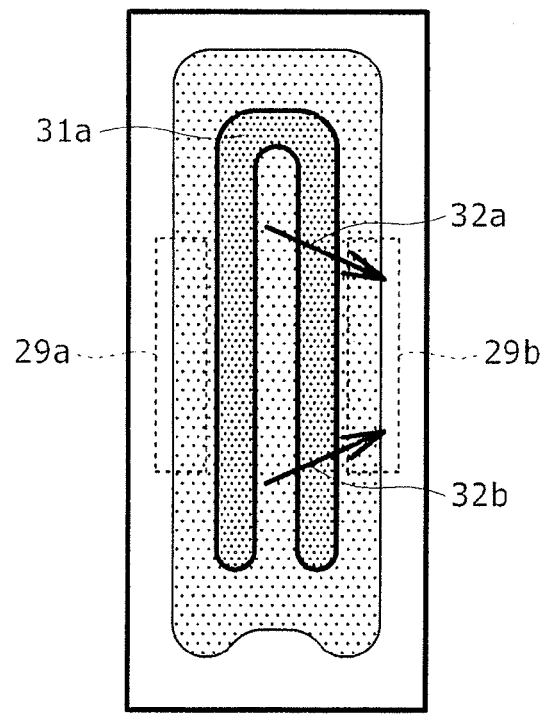
FIG. 6(b) is an illustration showing temperature distribution of the diaphragm portion of the related-art sensor element.

FIG. 6(a) shows the shape of a diaphragm 27a portion of a sensor element in a related-art thermal flow meter. The sensor element shown in FIG. 6(a) represents a shape that does not require low power consumption driving. Thus, a heating resistor 26a can be shaped to have a long length in the longitudinal direction. A heating temperature sensor 28a is disposed around and near the heating resistor 26a, similarly extending to be long in the longitudinal direction. The heating temperature sensor 28a is disposed on the left side, the upper side, and the right side on the paper surface of the heating resistor 26a, but not on the lower side of the heating resistor 26a. FIG. 6(b) shows isotherms representing temperature distribution on the diaphragm when voltage is applied to the heating temperature sensor 28a with respect to the shape of the diaphragm 27a portion shown in FIG. 6(a). It is noted that, in FIG. 6(b), the darker shaded portion indicates a, condition of higher temperatures. FIG. 6(b) reveals that the temperature increases as a result of self-heating on the left side, the upper side, and the right side of the heating resistor 26a on which the heating temperature sensor 28a is disposed. The temperature increases only a little on the lower side of the heating resistor 26a on which the heating temperature sensor 28a is not disposed. If inclined airflow streams 32a, 32b flow into the diaphragm 27a portion under the condition having the temperature distribution shown in FIG. 6(b), the airflow having an increased temperature after the heating resistor 26a flows to a downstream-side temperature sensor 29b. Temperatures at sites where the airflow streams 32a, 32b pass over the heating resistor 26a are substantially identical to each other. There is no change in temperature of the air flowing to the downstream-side temperature sensor 29b regardless of whether the airflow stream 32a or the airflow stream 32b flows. This is because the heating resistor 26a is long in the vertical direction on the paper surface, so that the downstream-side temperature sensor 29b is away from upper and lower portions of the heating resistor having different temperature distribution. No change in sensitivity therefore occurs in flow rate detection with the related-art sensor element shape requiring no low power consumption driving, enabling favorable airflow measurement.

Figure 7A:
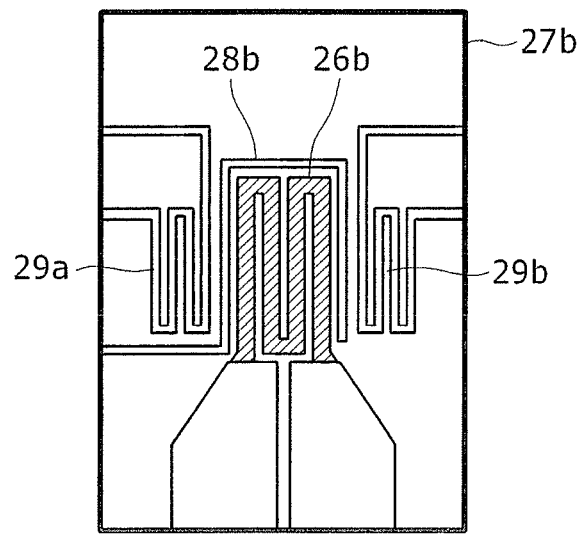
FIG. 7(a) is an illustration showing the shape of a diaphragm portion of a related-art sensor element.
Figure 7B:
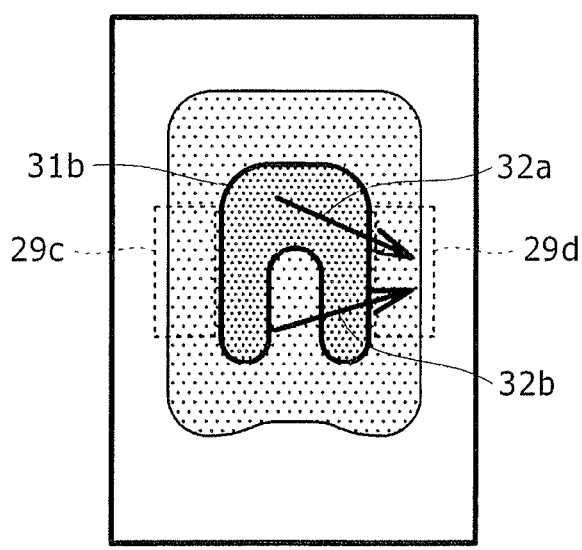
FIG. 7(b) is an illustration showing temperature distribution of the diaphragm portion of the related-art sensor element.

FIG. 7(a) shows the shape of a diaphragm 27b portion of a sensor element in a related-art thermal flow meter. The sensor element shown in FIG. 7(a) represents a shape that requires low power consumption driving. A heating resistor 26b is, for its low power consumption, formed to be shorter in length in the longitudinal direction than the heating resistor 26a shown in FIG. 6(a). A heating temperature sensor 28b is disposed around and near the heating resistor 26b, similarly extending to be short in the longitudinal direction. The heating temperature sensor 28b is disposed on the left side, the upper side, and the right side on the paper surface of the heating resistor 26b, but not on the lower side of the heating resistor 26b. FIG. 7(b) shows isotherms representing temperature distribution on the diaphragm when voltage is applied to the heating temperature sensor 28b with respect to the shape of the diaphragm 27b portion shown in FIG. 7(a). It is noted that, in FIG. 7(b), the darker shaded portion indicates a condition of higher temperatures. FIG. 7(b) reveals that the temperature increases as a result of self-heating on the left side, the upper side, and the right side of the heating resistor 26b on which the heating temperature sensor 28b is disposed. The temperature increases only a little on the lower side of the heating resistor 26b on which the heating temperature sensor 28b is not disposed. If inclined airflow streams 32a, 32b flow into the diaphragm 27b portion under the condition having the temperature distribution shown in FIG. 7(b), the airflow having an increased temperature after the heating resistor 26b flows to a downstream-side temperature sensor 29b. Temperatures at sites where the airflow streams 32a, 32b pass over the heating resistor 26a are different from each other. A temperature of the air flowing to the downstream-side temperature sensor 29b is high for the airflow stream 32a and low for the airflow stream 32b. This results in the temperature of the air flowing to the downstream-side temperature sensor 29b being changed by a change in the direction of the airflow. This is because the heating resistor 26b is short in length in the vertical longitudinal direction and the upper and lower portions of the heating resistor having different forms of temperature distribution are close to the downstream-side temperature sensor 29b. A sensitivity change therefore occurs in flow rate detection with the related-art sensor element shape requiring low power consumption driving, so that an error occurs in measurement of the airflow.

The change in measurement errors by the temperature distribution occurring from the length of the heating resistor will be described in detail below. FIG. 8 is a diagram showing temperature distribution on line Y-Y' when the heating resistor 26a shown in FIG. 6(a) is energized. The temperature distribution shown in FIG. 8 tells that the temperature of the heating resistor differs between the upper side and the lower side on the paper surface. This is because, whereas the heating temperature sensor 28a is disposed on the upper side on the paper surface of the heating resistor 26a, the heating temperature sensor 28a is not disposed on the lower side on the paper surface of the heating resistor. Therefore, the temperature increases because of self-heating of the heating temperature sensor 28a by different amounts between the upper and lower sides on the paper surface of the heating resistor. Now, let ΔTh be an average temperature of the entire heating resistor and ΔTht be a temperature increase amount by the self-heating of the heating temperature sensor 28a on the upper side of the heating resistor from ΔTh, then ΔTht substantially falls between 5° C. and 20° C.

Figure 9:
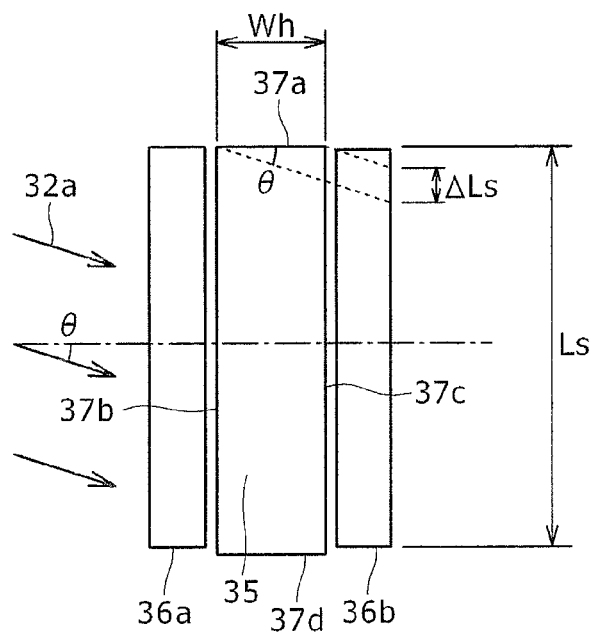
FIG. 9 is a schematic diagram showing the shape in FIG. 6(a).

FIG. 9 schematically shows areas in which the heating resistor 26a, the upstream-side temperature sensor 29a, and the downstream-side temperature sensor 29b shown in FIG. 6(a) are formed. In FIG. 9, an area 35 represents the area in which the heating resistor 26a in FIG. 6(a) is formed, an area 36a represents the area in which the upstream-side temperature sensor 29a shown in FIG. 6(a) is formed, and an area 36b represents the area in which the downstream-side temperature sensor 29b in FIG. 6(a) is formed. Referring further to FIG. 9, an end portion 37a represents an end portion of the heating resistor 26a on the upper side on the paper surface in FIG. 6(a), an end portion 37b represents an end portion of the heating resistor 26a on the left side on the paper surface (the upstream side of the airflow) in FIG. 6(a), and an end portion 37c represents an end portion of the heating resistor 26a on the right side on the paper surface (the downstream side of the airflow) in FIG. 6(a), and an end portion 37d represents an end portion of the heating resistor 26a on the lower side on the paper surface in FIG. 6(a). Additionally, whereas the heating temperature sensor 28a is disposed on the end portions 37a, 37b, 37c of the heating resistor, the heating temperature sensor 28a is not disposed on the end portion 37d of the heating resistor.

The temperature of air flowing to the area 36b of the downstream-side temperature sensor when the airflow flowing to the sensor element is inclined at an angle of θ relative to the horizontal direction of the heating resistor (32a in the figure) will be described. The temperature of the area near the end portion 37a of the heating resistor is higher by ΔTht as shown in FIG. 8 than other portions because of the self-heating of the heating temperature sensor 28a. As a result, the temperature of air that passes through the end portion 37a of the heating resistor is higher by ΔTht than those of other portions. Thus, air with a temperature higher by ΔTht flows to the area 36b of the downstream-side temperature sensor. The area through which the air with a temperature higher by ΔTht flows in the area 36b of the downstream-side temperature sensor is a portion marked with ΔLs in FIG. 9. ΔLs is expressed by:

$$\Delta Ls = Wh \cdot \tan \theta \quad (1)$$

Where, Wh is the width of the area 35 of the heating resistor and is the length of the end portion 37a of the heating resistor shown in FIG. 9. As described earlier, the portion marked with ΔLs has a temperature higher by ΔTht than other portions of the area 36b of the downstream-side temperature sensor does. If part (ΔLs) in the area 36b of the downstream-side temperature sensor has a high temperature (ΔTht), the average temperature of the area 36b of the downstream-side temperature sensor increases to ΔTh'. A ratio of ΔTh' to ΔTh that represents the temperature of the entire area 36b of the downstream-side temperature sensor with a sufficiently small self-heating of the heating temperature sensor, ΔTh'/ΔTh, is expressed by:

$$\Delta Th'/\Delta Th = 1 + \Delta Ls \Delta Tht/(Ls \Delta Th) = 1 + Wh \cdot \Delta Tht \cdot \tan \theta / (Ls \Delta Th) \quad (2)$$

where, Ls is the entire length of the area 36a of the upstream-side temperature sensor in the vertical direction on the paper surface and is also the entire length of the area 35 of the heating resistor in the vertical direction on the paper surface. Assuming, for example, that Wh=200 μm, Ls=900 μm, ΔTh=100° C., ΔTht=20° C., and θ=6 degrees, then:

$$\Delta Th'/\Delta Th = 1.004 \quad (3)$$

The average temperature thus changes by 0.4%. A change in the average temperature by 0.4% may be translated to a flow rate detection error of about 1.4%.

Figure 10:
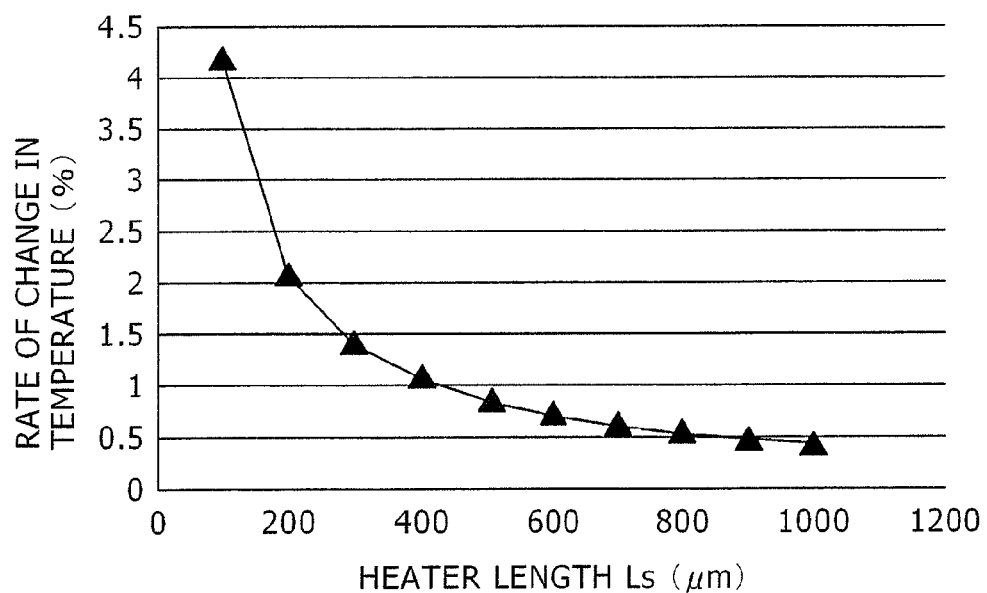
FIG. 10 is a graph showing a relationship between a length Ls of a heating resistor and a rate of change of heating temperature.

A case will be described below in which the length Ls of the area 35 of the heating resistor in the vertical direction on the paper surface is shorter under the above-described conditions. In this case, the length of the area 35 of the heating resistor in the vertical direction on the paper surface is assumed to be identical to the length of the area 36b of the downstream-side temperature sensor in the vertical direction on the paper surface. FIG. 10 shows a rate of change in heating temperature of the heating resistor relative to a change in the length Ls of the area 35 of the heating resistor, ΔTh'/ΔTh. ΔTh'/ΔTh is about 1% when Ls is 400 μm and the rate of change in temperature increases with even shorter Ls values. The embodiment of the present invention can therefore achieve reduction in the flow rate detection error caused by inclined airflow for a thermal flow meter that achieves low power consumption, such as that having a length Ls of the heating resistor of 400 μm or less.

Figure 11A:
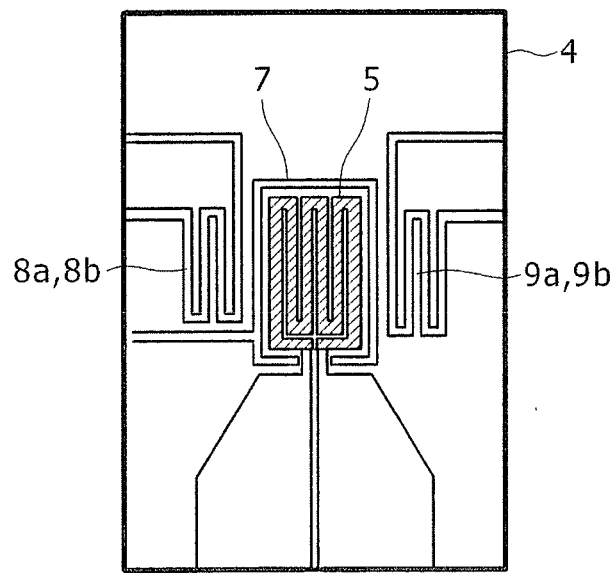
FIG. 11(a) is an illustration showing the shape of the diaphragm portion of the sensor element according to the embodiment of the present invention.
Figure 11B:
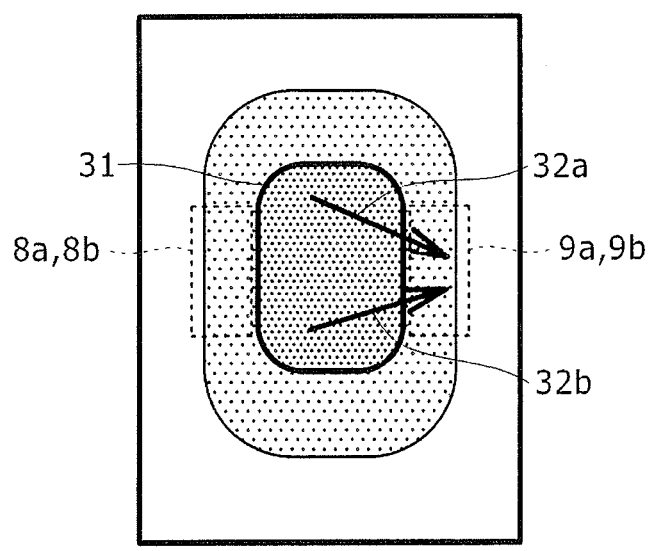
FIG. 11(b) is an illustration showing temperature distribution of the diaphragm portion of the sensor element according to the embodiment of the present invention.

FIG. 11(a) shows the shape of the diaphragm 4 portion of the sensor element in the thermal flow meter according to the embodiment of the present invention. The sensor element shown in FIG. 11(a) represents a shape that requires low power consumption driving. The heating resistor 5 is thus short in the longitudinal direction. The heating temperature sensor 7 is disposed around and near the heating resistor, similarly extending to be short in the longitudinal direction. The heating temperature sensor 7 is disposed on the left side, the upper side, the right side, and the lower side on the paper surface of the heating resistor 5; specifically, the heating temperature sensor 7 is disposed in substantially all directions of the heating resistor 5. FIG. 11(b) shows isotherms representing temperature distribution on the diaphragm when voltage is applied to the heating temperature sensor 7 relative to the shape of the diaphragm 4 portion shown in FIG. 11(a). It is noted that, in FIG. 11(b), the darker shaded portion indicates a condition of higher temperatures. FIG. 11(b) reveals that the temperature increases as a result of self-heating on the left side, the upper side, the right side, and the lower side of the heating resistor 5 on which the heating temperature sensor 7 is disposed. The self-heating occurring in substantially all directions of the heating resistor 5 results in the temperature distribution of the heating resistor 5 being substantially uniform. If inclined airflow streams 32a, 32b flow into the diaphragm 4 portion under the condition having the temperature distribution shown in FIG. 11(b), the airflow having an increased temperature after the heating resistor 5 flows to the downstream-side temperature sensors 9a, 9b. Temperatures at sites where the airflow streams 32a, 32b pass over the heating resistor 5 are substantially identical to each other. There is no change in temperature of the air flowing to the downstream-side temperature sensors 9a, 9b regardless of whether the airflow stream 32a or the airflow stream 32b flows. This is because of the following reasons. Specifically, the temperature distribution on the heating resistor 5 is uniform, the temperatures at the upper and lower portions of the heating resistor 5 are symmetrical with respect to a center of the heating resistor 5, and the temperature distribution near the downstream-side temperature sensors 9a, 9b is substantially uniform. In the embodiment of the present invention, therefore, even if the heating resistor 5 is made to be short in the longitudinal direction for lower power consumption, a change in sensitivity in flow rate detection as a result of a change in the flow direction does not occur, so that airflow measurement can be favorably made.

Figure 12A:
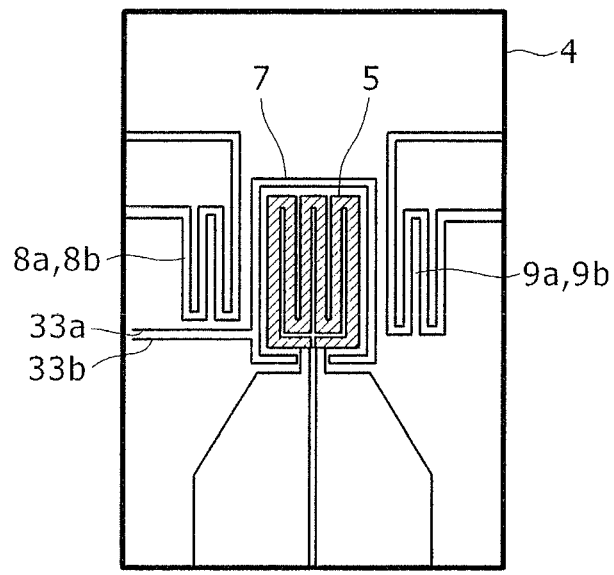
FIG. 12(a) is an illustration showing the shape of a diaphragm portion of a related-art sensor element.
Figure 12B:
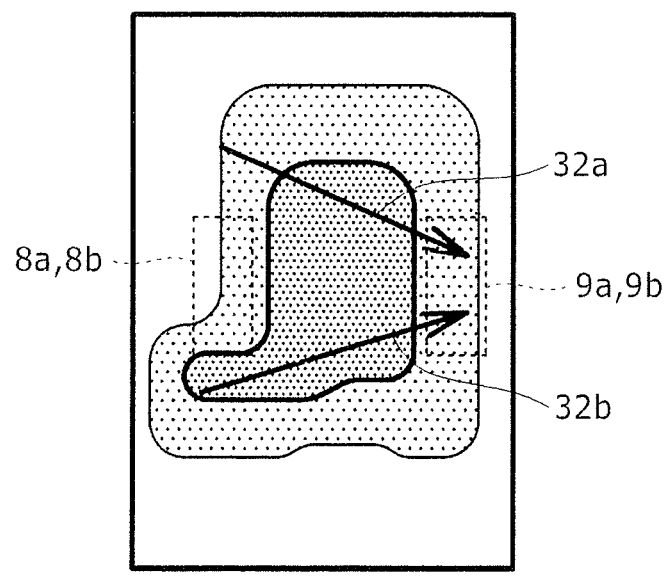
FIG. 12(b) is an illustration showing temperature distribution of the diaphragm portion of the related-art sensor element.

To make the temperature distribution around the heating resistor 5 uniform, preferably, wiring portions 33a, 33b for leading the electrodes of the heating temperature sensor 7 are to be made to have a wide width as shown in FIG. 5. If, for example, the heating temperature sensor 7 is formed to have a wire width of 1 to 5 micrometers, the wiring portions 33a, 33b are set to have a width of 10 to 50 micrometers, about ten times as wide as the heating temperature sensor 7. Effects of this arrangement will be described with reference to FIGS. 12(a) and 12(b). FIG. 12(a) is an illustration showing the shape of the diaphragm 4 portion of the thermal flow meter when the wiring portions 33a, 33b of the heating temperature sensor 7 are formed to have the same width as the heating temperature sensor 7. FIG. 12(b) shows temperature distribution on the diaphragm 4 when the wiring portions 33a, 33b of the heating temperature sensor 7 are formed to have the same width as the heating temperature sensor 7. The temperature distribution shown in FIG. 12(b) represents that for an increase in temperature when voltage is applied to the heating temperature sensor 7. It is noted that, in FIG. 12(b), the darker shaded portion indicates a condition of higher temperatures. The wiring portions 33a, 33b are formed of the same material as that used for the heating temperature sensor 7. Since the wiring portions 33a, 33b have resistance of several tens of ohms, self-heating occurs therein when voltage is applied thereto. As a result, a temperature increase occurs in the wiring portions 33a, 33b as shown in FIG. 12(b), so that the temperature distribution around the heating resistor 5 become non-uniform. If the airflow streams 32a, 32b having different flow directions flow under this condition, the airflow streams that have flowed over different temperatures reach the downstream-side temperature sensors 9a, 9b, thus changing the temperature of the downstream-side temperature sensors 9a, 9b. By widening the wire width of the wiring portions 33a, 33b, resistance values of the wiring portions 33a, 33b can be reduced to thereby decrease self-heating. This allows the temperature distribution shown in FIG. 12(b) to be closer to that shown in FIG. 11(b). A change in sensitivity in flow rate detection as a result of a change in the direction of flow does not occur, so that favorable airflow measurement can be made.

Figure 13:
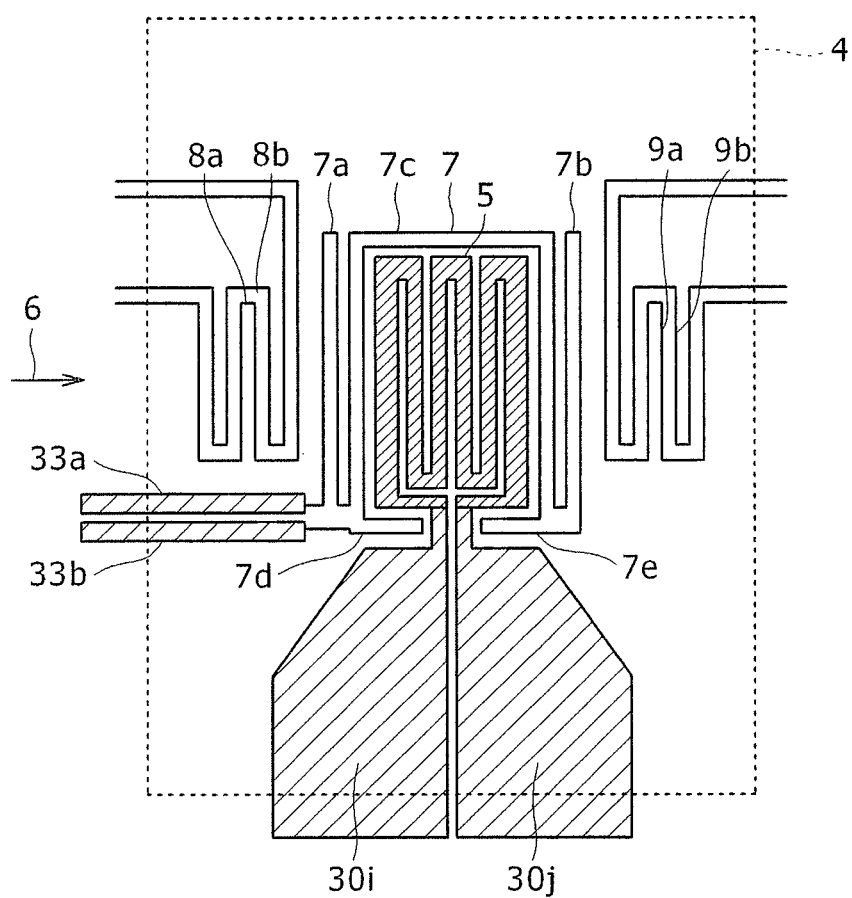
FIG. 13 is a plan view showing a diaphragm portion of a sensor element according to an embodiment of the present invention.

An even more preferred shape will be described below with reference to FIG. 13. A heating temperature sensor 7 shown in FIG. 13 includes a heating temperature sensor 7a disposed on the left side of a heating resistor 5, a heating temperature sensor 7b disposed on the right side of the heating resistor 5, a heating temperature sensor 7c disposed on the upper side of the heating resistor 5, and heating temperature sensors 7d, 7e disposed on the lower side of the heating resistor 5. The heating temperature sensor 7a includes four resistors juxtaposed to each other, the four resistors being connected in series with each other to form a turnaround structure. The same configuration applies to the heating temperature sensor 7b. Each of the heating temperature sensors 7c, 7d, 7e includes two resistors juxtaposed to each other. The heating temperature sensors 7a, 7b have more resistors juxtaposed to each other than the heating temperature sensors 7c, 7d, 7e do. Arraying and connecting a number of resistors in juxtaposition and in series with each other in the foregoing manner allows the resistance value of the heating temperature sensor to be increased. Setting resistance to a high value allows current that flows when a predetermined voltage is applied to the heating temperature sensor 7 to be reduced, thereby further preventing self-heating from occurring. Moreover, the ratio of resistance of the wiring portions 33a, 33b to resistance of the heating temperature sensor 7 becomes small, so that an amount of heat generated at the wiring portions 33a, 33b can be reduced and the temperature distribution can be made even more uniform.

The reason why having more resistors juxtaposed with each other in the heating temperature sensors 7a, 7b than in the heating temperature sensors 7c, 7d, 7e is preferable will be described below. Referring to FIG. 13, the heating resistor 5 has wiring portions 30i, 30j for leading the electrodes. Throttle portions for connecting the wiring portions 30i, 30j to the heating resistor 5 are narrowed in width to meet the need for allowing areas to accommodate therein the number of resistors included in the heating temperature sensors 7d, 7e. If the narrow-width portions of the wiring portions 30i, 30j are long, therefore, resistance at these portions increases to thereby generate a greater amount of heat. As a result, the temperature distribution around the heating resistor 5 becomes non-uniform. To reduce the self-heating value, while increasing the resistance value of the heating temperature sensor 7, preferably more resistors are to be juxtaposed with each other in the heating temperature sensors 7a, 7b than in the heating temperature sensors 7c, 7d, 7e. Additionally, when the wiring portions 30i, 30j of the heating resistor 5 are to be formed, the wiring portions 30i, 30j are led from the central portion of the heating resistor 5 and then formed to increase their wire width gradually toward the end portion of the diaphragm 4. Specifically, the heating temperature sensors 7d, 7e are disposed so as to be sandwiched between the lower portion of the heating resistor 5 and the wiring portions 30i, 30j disposed on the diaphragm 4. This allows the wiring portions 30i, 30j to be formed to have an even wider wire width, the resistance value to be small for reduced self-heating, and an increase in temperature caused by current flowing therethrough to be reduced. This improves uniformity of the temperature distribution around the heating resistor 5 to thereby eliminate a change in sensitivity in flow rate detection caused by a change in the direction of flow, thus achieving favorable airflow measurement.

Figure 14A:
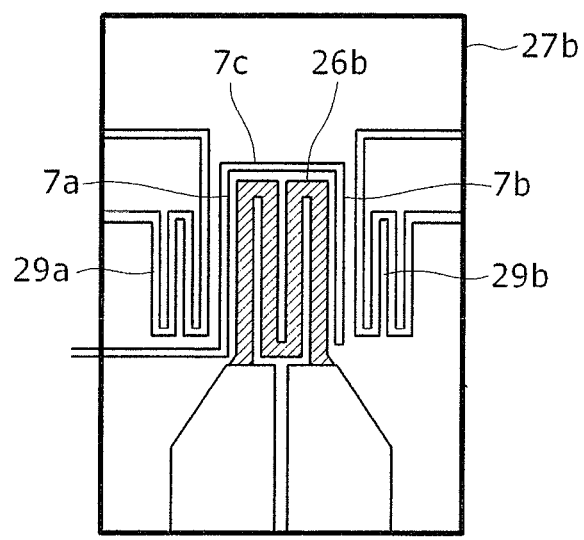
FIG. 14(a) is an illustration showing the shape of a diaphragm portion of a related-art sensor element.
Figure 14B:
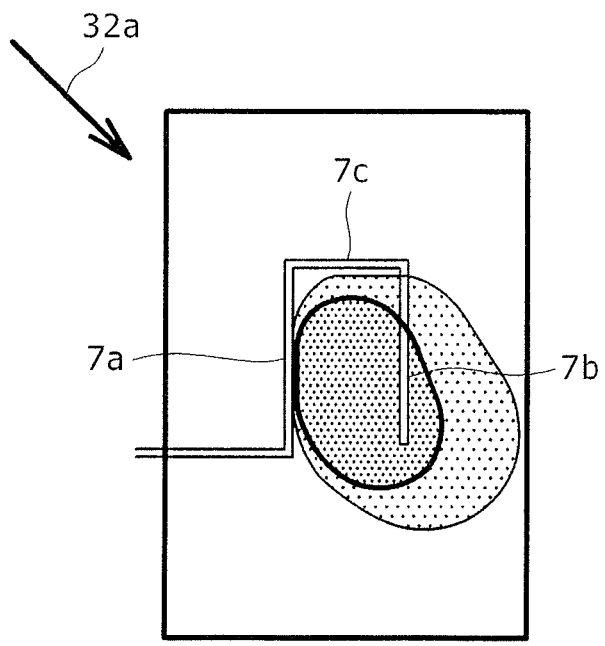
FIG. 14(b) is an illustration showing exemplary temperatures detected by a heating temperature sensor in the related-art arrangement.
Figure 14C:
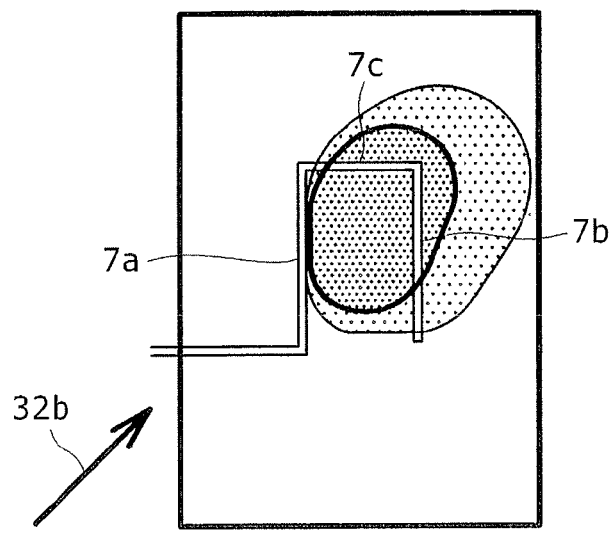
FIG. 14(c) is an illustration showing exemplary temperatures detected by a heating temperature sensor in the related-art arrangement.

An effect of improved accuracy in detecting temperature of the heating resistor achieved by the embodiment of the present invention will be described below. FIGS. 14(a) to 14(c) show conditions of temperatures detected by the heating temperature sensor when the inclined airflow streams 32a, 32b flow in the related-art arrangement. Referring to FIG. 14(a), the related-art heating temperature sensor includes a heating temperature sensor 7a disposed on the left side on the paper surface of the heating resistor 26b (upstream of the airflow), a heating temperature sensor 7b disposed on the right side on the paper surface of the heating resistor 26b (downstream of the airflow), and a heating temperature sensor 7c disposed on the upper side on the paper surface of the heating resistor 26b, for detecting the temperature of the heating resistor 26b. FIG. 14(b) shows the temperature distribution when the inclined airflow stream 32a flows in the related-art arrangement. The airflow stream 32a flows from the upper left on the paper surface to the lower right on the paper surface. When the airflow stream 32a flows, the temperatures of the heating temperature sensors 7a, 7c decrease because the heating temperature sensors 7a, 7c are disposed upstream of the heating resistor 26b. In contrast, since the heating temperature sensor 7b is disposed downstream of the heating resistor 26b, the temperature of the heating temperature sensor 7b increases. FIG. 14(c) shows the temperature distribution when the inclined airflow stream 32b flows. The airflow stream 32b flows from the lower left on the paper surface to the upper right on the paper surface. When the airflow stream 32b flows, the temperature of the heating temperature sensor 7a decreases because the heating temperature sensor 7a is disposed upstream of the heating resistor 26b. In contrast, since the heating temperature sensors 7b, 7c are disposed downstream of the heating resistor 26b, the temperatures of the heating temperature sensors 7b, 7c increase. Comparing FIG. 14(b) with FIG. 14(c), it is known that the temperature of the heating temperature sensor 7a decreases in both cases and the temperature of the heating temperature sensor 7b increases in both cases; however, the temperature of the heating temperature sensor 7c decreases for the airflow stream 32a and increases for the airflow stream 32b. Specifically, the heating temperature sensor 7c detects temperatures that change depending on the inclination of the airflow stream. This causes an error to occur in temperature control for the heating resistor 26b, thus serving as a factor contributing to a flow rate detection error.

Figure 15A:
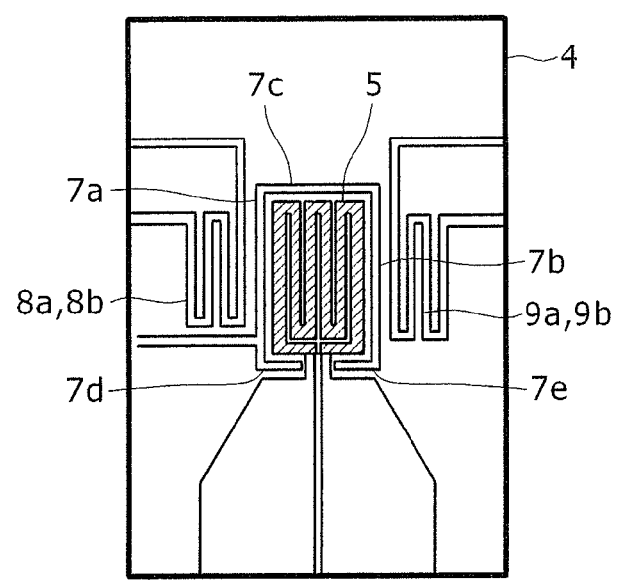
FIG. 15(a) is an illustration showing the shape of a diaphragm portion of a related-art sensor element.
Figure 15B:
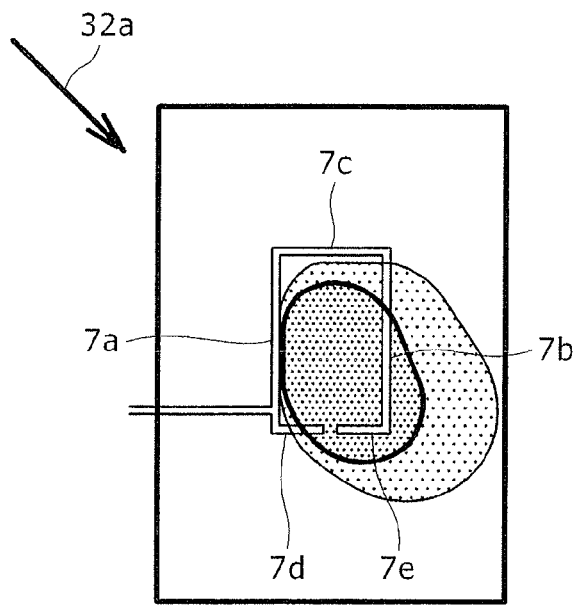
FIG. 15(b) is an illustration showing exemplary temperatures detected by a heating temperature sensor in the arrangement according to the embodiment of the present invention.
Figure 15C:
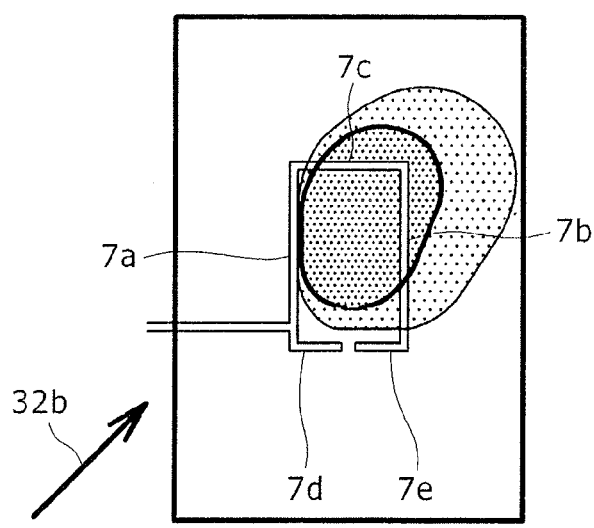
FIG. 15(c) is an illustration showing exemplary temperatures detected by a heating temperature sensor in the arrangement according to the embodiment of the present invention.

FIGS. 15(a) to 15(c) show conditions of temperatures detected by the heating temperature sensor when the inclined airflow streams 32a, 32b flow in the arrangement according to the embodiment of the present invention. Referring to FIG. 15(a), the heating temperature sensor in the arrangement according to the embodiment of the present invention includes the heating temperature sensor 7a disposed on the left side on the paper surface of the heating resistor 5 (upstream of the airflow), the heating temperature sensor 7b disposed on the right side on the paper surface of the heating resistor 5 (downstream of the airflow), the heating temperature sensor 7c disposed on the upper side on the paper surface of the heating resistor 5, and the heating temperature sensors 7d, 7e disposed on the lower side on the paper surface of the heating resistor 5, for detecting the temperature of the heating resistor 5. FIG. 15(b) shows the temperature distribution when the inclined airflow stream 32a flows in the arrangement according to the embodiment of the present invention. The airflow stream 32a flows from the upper left on the paper surface to the lower right on the paper surface. When the airflow stream 32a flows, the temperatures of the heating temperature sensors 7a, 7c decrease because the heating temperature sensors 7a, 7c are disposed upstream of the heating resistor 5. Since the heating temperature sensors 7b, 7d, 7e are disposed downstream of the heating resistor 5, the temperatures of the heating temperature sensors 7b, 7d, 7e increase. FIG. 15(c) shows the temperature distribution when the inclined airflow stream 32b flows. The airflow stream 32b flows from the lower left on the paper surface to the upper right on the paper surface. When the airflow stream 32b flows, the temperatures of the heating temperature sensors 7a, 7d, 7e decrease because the heating temperature sensors 7a, 7d, 7e are disposed upstream of the heating resistor 5. In contrast, since the heating temperature sensors 7b, 7c are disposed downstream of the heating resistor 5, the temperatures of the heating temperature sensors 7b, 7c increase. Comparing FIG. 15(b) with FIG. 15(c), it is known that the temperature of the heating temperature sensor 7a decreases in both cases and the temperature of the heating temperature sensor 7b increases in both cases, so that both the heating temperature sensors 7a and 7b are not affected by the inclination of the airflow stream. The temperature of the heating temperature sensor 7c decreases for the airflow stream 32a and increases for the airflow stream 32b. In contrast, the temperatures of the heating temperature sensors 7d, 7e increase for the airflow stream 32a and decrease for the airflow stream 32b. Though the temperatures of the heating temperature sensors 7c, 7d, 7e reverse between high and low depending on the inclination of the airflow stream, the average temperature of these heating temperature sensors is maintained constantly. Assuming that the heating temperature sensors 7a to 7e are connected in series with each other to form the single heating temperature sensor 7, therefore, the temperature of the heating temperature sensor 7 is the average temperature of the heating temperature sensors 7a to 7e. Thus, the temperature detected by the heating temperature sensor 7 (7a to 7e combined) can be maintained constantly even with the airflow stream inclines. This allows temperature control of the heating resistor 5 to be steadied even with inclination occurs in the airflow, thereby improving flow rate detection accuracy.

From the foregoing, the arrangement according to the embodiment of the present invention achieves steady temperature control of the heating resistor 5 and improved flow rate measurement accuracy based on not only the temperature difference system in which the flow rate is detected using a temperature difference between the upstream-side temperature sensors 8a, 8b and the downstream-side temperature sensors 9a, 9b as shown in FIG. 5, but also a direct heat system in which the flow rate is detected by measuring voltage or current of the heating resistor 5.

A method for manufacturing the sensor element 1 according to the first embodiment will be described below. The semiconductor substrate 2 formed of, for example, monocrystalline silicon (Si) is used as the substrate. Silicon dioxide ($SiO_2$) and silicon nitride ($Si_3N_4$) that assume the electrically insulating film 3a having a predetermined thickness of about 1 μm are formed on the surface of the base monocrystalline silicon (Si) substrate 2 by, for example, thermal oxidation or the CVD method. Then, a semiconductor thin film formed of polycrystalline silicon (Si) having a thickness of about 1 μm is laminated as a resistor by, for example, the CVD method.

Then, impurities are diffused into the polycrystalline silicon (Si) semiconductor thin film. High-concentration doping operation is performed so as to achieve predetermined resistivity. In addition, a resist is formed into a predetermined shape by a well-known photolithography method and then the polycrystalline silicon (Si) semiconductor thin film is patterned by, for example, the reactive ion etching method. This produces the predetermined resistors 5, 7, 8a, 8b, 9a, 9b, 10, 11, and 12 and the wiring portions 30a to 30n.

In the subsequent process, the electrically insulating film 3b as a protective film is formed. During the process, a film of silicon dioxide ($SiO_2$) and silicon nitride ($Si_3N_4$) is formed to have a thickness of about 1 microns by, for example, the CVD method as in the case of the electrically insulating film 3a.

Next, terminal electrodes to serve as terminals for connection to an external circuit are formed of, for example, aluminum and gold in the electrode pad portion 13 after the protective film 3b is removed. Alternatively, the wiring portions 30a to 30n for connecting the resistors to their corresponding terminals may have a multilayer film structure including the polycrystalline silicon (Si) semiconductor thin film, aluminum, and gold.

In the final process, an etching-mask material is formed on the back surface of the monocrystalline silicon (Si) semiconductor substrate 2 and patterned into a predetermined shape. Anisotropic etching is performed using an etchant, such as potassium hydroxide (KOH). A cavity portion is thereby formed and the diaphragm 4 is formed.

Through the above-described processes, fabrication of the sensor element 1 is completed.

The foregoing embodiments have been described for a case that uses the polycrystalline silicon (Si) semiconductor film as the resistor. The same effects can nonetheless be achieved from a case in which a metal material, such as platinum, molybdenum, tungsten, and nickel alloys, is used. To drive the heating resistor at low power consumption, low voltage, and low current with a metal material used for the heating resistor 5, the heating temperature sensor 7, the upstream-side temperature sensors 8a, 8b, and the downstream-side temperature sensors 9a, 9b, preferably the heating resistor 5 is formed to be even more compact in size. The reason for this is as follows. Specifically, the metal material has high resistance to heat and the heating temperature of the heating resistor 5 may be set to range between 150° C. and 300° C. for enhanced sensitivity. Meanwhile, the increased heating temperature leads to increased power consumption. Forming a compact heating resistor therefore allows the increase in the power consumption to be reduced. However, a compact heating resistor poses a problem of non-uniformity of the temperature distribution around the heating resistor 5 as described earlier. Then, application of the present invention allows the temperature distribution around the heating resistor 5 to be uniform even with the self-heating of the heating temperature sensor around the heating resistor 5, so that a change in sensitivity in flow rate detection as a result of a change in the flow direction does not occur and airflow measurement can be favorably made. Consequently, the present invention is even more effective with a case in which a sensor element incorporating a resistor formed of a metal material is to be driven with lower electric power.

In the embodiment described above, the heating resistor 5 is formed substantially into an M-shape on the diaphragm 4 portion. The same effects can nonetheless be achieved from substantially a U-shape or a meander shape.

The foregoing embodiments have been described for a case that incorporates two pairs of temperature-measuring resistors 8a, 8b, 9a, 9b disposed upstream and downstream of the heating resistor 5. The same effects can nonetheless be achieved from an arrangement incorporating one pair of temperature-measuring resistors.

Second Embodiment

Figure 16:
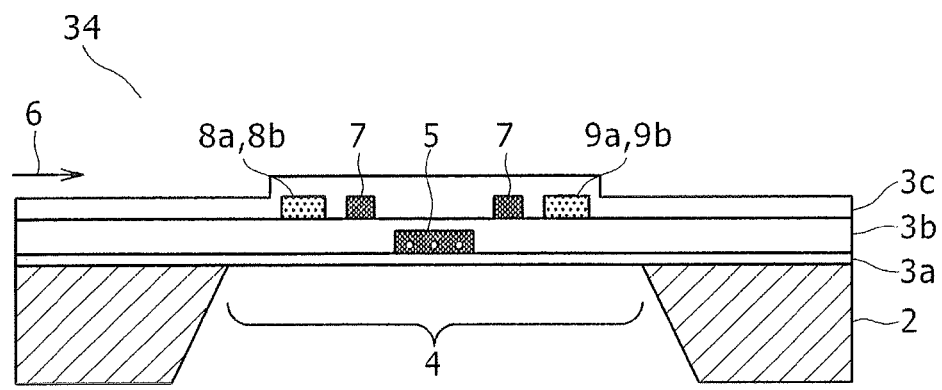
FIG. 16 is a cross-sectional view showing a sensor element 34 of a thermal type flow rate sensor according to a second embodiment of the present invention.
Figure 17:
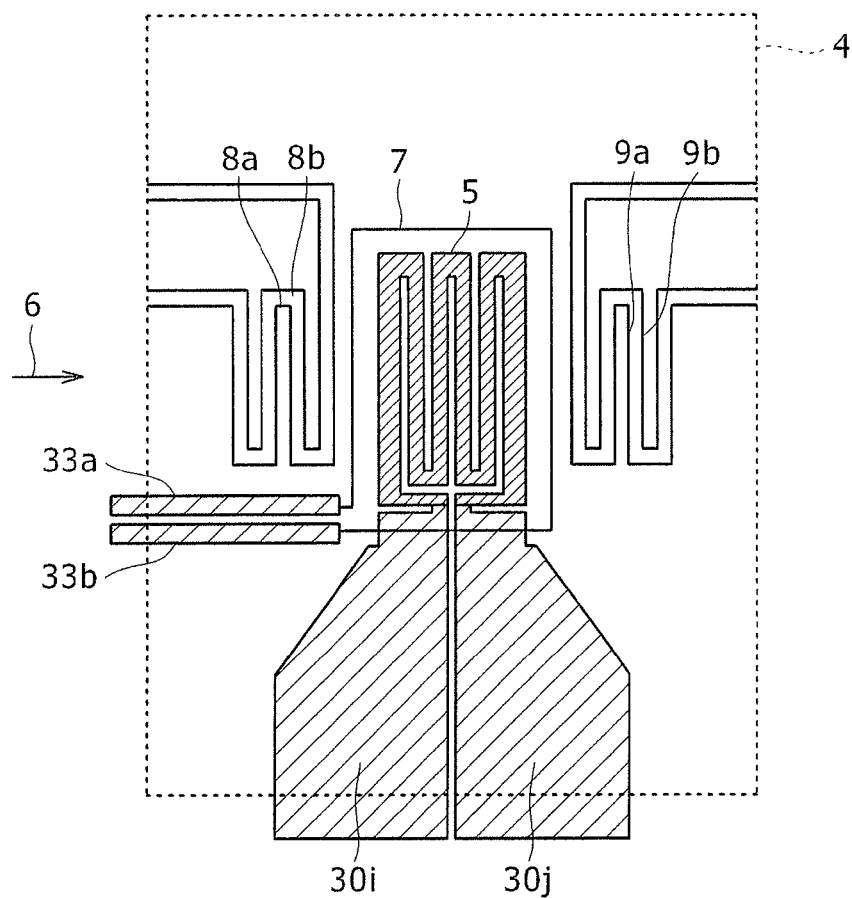
FIG. 17 is an enlarged view showing the diaphragm 4 portion of the sensor element 34 shown in FIG. 16.

A second embodiment of the present invention will be described below. An arrangement of a sensor element 34 of a thermal flow meter according to this embodiment will be described below with reference to FIGS. 16 and 17. FIG. 16 is a cross-sectional view showing the sensor element 34. FIG. 17 is a plan view showing a diaphragm 4 portion of the sensor element 34 shown in FIG. 16. The sensor element 34 includes a substrate 2 formed of a material having a good thermal conductivity, such as silicon and ceramics. An electrically insulating film 3a is formed on the substrate 2. The substrate 2 is then etched from a back side thereof to form a cavity portion, thus forming the diaphragm 4.

A heating resistor 5 is formed on a surface near a center of the electrically insulating film 3a on the diaphragm 4. The heating resistor 5 is then covered with an electrically insulating film 3b. The electrically insulating film 3b is formed so as to cover the heating resistor 5 and the diaphragm 4. A heating temperature sensor 7 for detecting heating temperature of the heating resistor 5 is formed on the electrically insulating film 3b so as to surround the heating resistor 5. The heating temperature sensor 7 detects the temperature of the heating resistor 5 and heating control is performed such that the temperature of the heating resistor 5 is higher by a predetermined temperature relative to the temperature of airflow 6. In addition, upstream-side temperature sensors 8a, 8b and downstream-side temperature sensors 9a, 9b are formed on both sides of the heating temperature sensor 7. The upstream-side temperature sensors 8a, 8b are disposed upstream in the airflow 6 of the temperature of the heating resistor 5 and the downstream-side temperature sensors 9a, 9b are disposed downstream in the airflow 6 of the heating resistor 5. An electrically insulating film 3c covers a frontmost surface of the sensor element 34. The electrically insulating film 3c serves as a protective film, in addition to providing electrical insulation.

The heating resistor 5, the heating temperature sensor 7, the upstream-side temperature sensors 8a, 8b, the downstream-side temperature sensors 9a, 9b, and temperature-sensitive resistors 10, 11, 12 are formed of a material having a resistance value varying according to temperature, specifically, a relatively high temperature coefficient of resistance. Preferred materials include, for example, semiconductor materials such as polycrystalline silicon and monocrystalline silicon that are doped with impurities and metal materials such as platinum, molybdenum, tungsten, and nickel alloys.

The electrically insulating film 3a, 3b are to be formed into a thin film having a thickness of about 2 microns, using silicon dioxide ($SiO_2$) or silicon nitride ($Si_3N_4$) to thereby offer a structure of achieving a sufficient heat insulation effect.

It is noted that, as described above, the heating resistor 5, the heating temperature sensor 7, the upstream-side temperature sensors 8a, 8b, and the downstream-side temperature sensors 9a, 9b are a temperature-sensitive resistor like the temperature-sensitive resistors 10, 11, 12.

What differs from the first embodiment shown in FIG. 5 is that the heating resistor 5 and the heating temperature sensor 7 are formed on layers different from each other. This allows the heating temperature sensor 7 to surround completely the periphery of the heating resistor 5 as shown in FIG. 17. Wiring portions 30i, 30j of the heating resistor 5 are also disposed on a layer different from that of the heating temperature sensor 7, which allows a wiring area to be widened and a resistance value to be reduced. As a result, the self-heating of the wiring portions 30i, 30j can be reduced and the temperature distribution around the heating resistor 5 can be made even more uniform, so that a change in sensitivity in flow rate detection as a result of a change in the flow direction does not occur and airflow measurement can be favorably made.

In this embodiment, the heating resistor 5 is disposed on a layer downward of the layer on which the heating temperature sensor is disposed. The same effects can nonetheless be achieved even if the heating temperature sensor is disposed on a lower layer and the heating resistor 5 is disposed on an upper layer.

Third Embodiment

Figure 18:
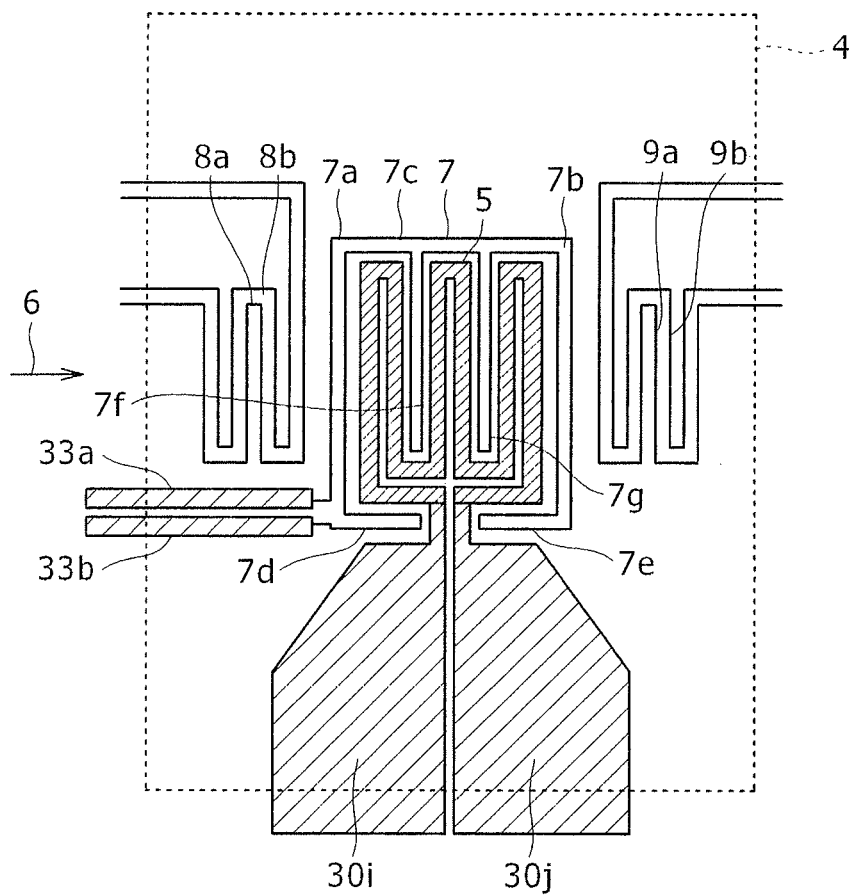
FIG. 18 is an enlarged view showing a diaphragm 4 portion of a sensor element in a thermal type flow rate sensor according to a third embodiment of the present invention.

A third embodiment of the present invention will be described below. An arrangement of a sensor element 34 of a thermal flow meter according to this embodiment will be described below with reference to FIG. 18. This embodiment differs from the first embodiment in disposition of a heating temperature sensor 7. The heating temperature sensor 7 according to this embodiment includes heating temperature sensors 7f, 7g disposed on the inside of a heating resistor 5, in addition to a heating temperature sensor 7a disposed on the left side of the heating resistor 5, a heating temperature sensor 7b disposed on the right side of the heating resistor 5, a heating temperature sensor 7c disposed on the upper side of the heating resistor 5, and heating temperature sensors 7d, 7e disposed on the lower side of the heating resistor 5. The heating temperature sensors 7a to 7g are electrically connected. The heating temperature sensors 7f, 7g are disposed among a plurality of resistors disposed in a turnaround structure of the heating resistor 5.

The foregoing arrangement makes self-heating by the heating temperature sensor 7 even more uniform in areas around and inside the heating resistor 5 and makes temperature distribution on the heating resistor 5 uniform. Therefore, a change in sensitivity in flow rate detection as a result of a change in the flow direction does not occur and airflow measurement can be favorably made.

DESCRIPTION OF REFERENCE NUMERALS 1, 34: Sensor element
2: Substrate
3a, 3b, 3c: Electrically insulating film
4, 27a, 27b: Diaphragm
5, 26a, 26b: Heating resistor
6: Airflow
7, 7a, 7b, 7c, 7d, 7e, 28a, 28b: Heating temperature sensor 8a, 8b, 29a, 29c: Upstream-side temperature sensor
9a, 9b: Downstream-side temperature sensor
10, 11, 12: Temperature-sensitive resistor
13: Electrode pad portion
14: Temperature distribution
15, 17: Amplifier
16: Transistor
18: Intake line
19: Base member
20: Intake air
21: Subsidiary passage
22: Circuit board
23: Gold bonding wire
24: Terminal
25: Aluminum bonding wire
29b, 29d: Related-art downstream-side temperature sensor
30a to n, 33a, 33b: Wiring portion
31: High temperature portion
32a, 32b: Direction of airflow
35: Area of heating resistor
36a: Area of upstream-side temperature sensor
36b: Area of downstream-side temperature sensor
37a, 37b, 37c, 37d: End portion of heating resistor
38a, 38b: Recess

The invention claimed is:

1. A thermal flow meter comprising:
a subsidiary passage having an opening portion through which a fluid to be measured is to be drawn in; and
a sensor element disposed in the subsidiary passage, the sensor element for measuring a flow rate of the fluid to be measured;
wherein the sensor element includes:
a semiconductor substrate;
a cavity portion formed in the semiconductor substrate;
a heating resistor formed on the cavity portion via an electrically insulating film;
a heating temperature sensor for detecting heating temperature of the heating resistor; and
a driving circuit for controlling the heating temperature of the heating resistor using the temperature detected by the heating temperature sensor; and
wherein the heating temperature sensor comprises temperature-sensitive resistors having resistance values varying according to temperature and disposed upstream and downstream of the heating resistor in a direction of flow of the fluid to be measured relative to the heating resistor and disposed on upper and lower sides of the heating resistor in a direction perpendicular to the direction of flow of the fluid to be measured relative to the heating resistor.

2. The thermal flow meter according to claim 1, wherein the heating temperature sensors disposed upstream and downstream in the direction of flow of the fluid to be measured relative to the heating resistor are formed of a pattern of a plurality of resistors having a turnaround configuration; and
the pattern of the plurality of resistors are electrically connected in series on the electrically insulating film on the cavity portion.

3. The thermal flow meter according to claim 2, wherein the pattern of resistors of the heating temperature sensor has a number of resistors disposed upstream and downstream in the direction of flow of the fluid to be measured relative to the heating resistor more than a number of resistors disposed on the upper and lower sides of the heating resistor.

4. The thermal flow meter according to claim 1, wherein the heating resistor has a wire for leading an electrode of the heating resistor from the upper side or the lower side of the heating resistor to an outside of the cavity portion; and
the wire has a wire width narrower than a width in a short side direction of the heating resistor at a portion connected to the heating resistor and wider at an end portion of the cavity portion than the wire width at the portion connected to the heating resistor.

5. The thermal flow meter according to claim 4, wherein the heating temperature sensor disposed on the lower side of the heating resistor is disposed so as to be sandwiched between the heating resistor and the wire.

6. A thermal flow meter comprising:
a subsidiary passage having an opening portion through which a fluid to be measured is to be drawn in; and
a sensor element disposed in the subsidiary passage, the sensor element for measuring a flow rate of the fluid to be measured,
wherein the sensor element includes:
a semiconductor substrate;
a cavity portion formed in the semiconductor substrate;
a heating resistor formed on the cavity portion via an electrically insulating film;
a heating temperature sensor for detecting heating temperature of the heating resistor;
a driving circuit for controlling the heating temperature of the heating resistor using the temperature detected by the heating temperature sensor; and
a wiring portion connected electrically to the heating resistor;
wherein the heating resistor and the wiring portion have a connecting portion for connecting therebetween, the connecting portion including a throttle portion; and
wherein the heating temperature sensor is disposed along the throttle portion so as to surround a periphery of the heating resistor.

7. The thermal flow meter according to claim 6, wherein the throttle portion comprises a recess formed by the heating resistor and the wiring portion; and
the heating temperature sensor is disposed along the recess.

8. The thermal flow meter according to claim 1, wherein a first temperature-sensitive resistor and a second temperature-sensitive resistor are disposed upstream in the direction of flow of the fluid to be measured relative to the heating resistor and a third temperature-sensitive resistor and a fourth temperature-sensitive resistor are disposed downstream in the direction of flow of the fluid to be measured relative to the heating resistor; and
the flow rate of the fluid to be measured is measured based on a change in resistance variable according to a difference in temperature of the first to fourth temperature-sensitive resistors.

9. The thermal flow meter according to claim 1, wherein an electrically insulating film is formed on an upper surface of the heating resistor and the heating temperature sensor is formed on a front surface of the electrically insulating film.

10. The thermal flow meter according to claim 1, further comprising:
a wiring portion for leading electrically from the heating temperature sensor to an outside of the cavity portion, wherein
the wiring portion has a wire width on the cavity portion wider than a wire width of the heating temperature sensor.

11. The thermal flow meter according to claim 1, wherein
the heating resistor is formed into a pattern having a plurality of turnaround portions; and
the heating temperature sensor is disposed along the turnaround portions of the heating resistor.

12. The thermal flow meter according to claim 1, wherein
the subsidiary passage includes: a throttle portion disposed near the opening portion, the throttle portion having a gradually narrowing passage area; a linear portion disposed near a position at which the sensor element is disposed, the linear portion having a straight pathway; and a curved portion disposed between the throttle portion and the linear portion, the curved portion having a curved pathway.

13. The thermal flow meter according to claim 6, wherein
a first temperature-sensitive resistor and a second temperature-sensitive resistor are disposed upstream in the direction of flow of the fluid to be measured relative to the heating resistor and a third temperature-sensitive resistor and a fourth temperature-sensitive resistor are disposed downstream in the direction of flow of the fluid to be measured relative to the heating resistor; and
the flow rate of the fluid to be measured is measured based on a change in resistance variable according to a difference in temperature of the first to fourth temperature-sensitive resistors.

14. The thermal flow meter according to claim 6, wherein
an electrically insulating film is formed on an upper surface of the heating resistor and the heating temperature sensor is formed on a front surface of the electrically insulating film.

15. The thermal flow meter according to claim 6, further comprising:
a wiring portion for leading electrically from the heating temperature sensor to an outside of the cavity portion, wherein
the wiring portion has a wire width on the cavity portion wider than a wire width of the heating temperature sensor.

16. The thermal flow meter according to claim 6, wherein
the heating resistor is formed into a pattern having a plurality of turnaround portions; and
the heating temperature sensor is disposed along the turnaround portions of the heating resistor.

17. The thermal flow meter according to claim 6, wherein
the subsidiary passage includes: a throttle portion disposed near the opening portion, the throttle portion having a gradually narrowing passage area; a linear portion disposed near a position at which the sensor element is disposed, the linear portion having a straight pathway; and a curved portion disposed between the throttle portion and the linear portion, the curved portion having a curved pathway.

* * * * *